May 16, 1967 J. W. HALBROOK 3,319,335
AUTOMATIC STEREOTEMPLET SCALE ADJUSTER
Filed April 15, 1964 2 Sheets-Sheet 1

INVENTOR.
JAMES W. HALBROOK
BY
ATTORNEY

May 16, 1967     J. W. HALBROOK     3,319,335
AUTOMATIC STEREOTEMPLET SCALE ADJUSTER
Filed April 15, 1964                                             2 Sheets-Sheet 2

INVENTOR.
JAMES W. HALBROOK
BY
ATTORNEY

United States Patent Office 3,319,335
Patented May 16, 1967

3,319,335
AUTOMATIC STEREOTEMPLET SCALE ADJUSTER
James W. Halbrook, 1314 Bunker Hill Road,
Alexandria, Va. 22308
Filed Apr. 15, 1964, Ser. No. 360,151
4 Claims. (Cl. 33—1)

ABSTRACT OF THE DISCLOSURE

This invention comprises a spring loaded scale adjuster and the method of using it in photogrammetry to position adjacent stereotemplets, constructed from aerial photographs in an overlapping manner, at common control points to form a stereotemplet layout, averaging the errors inherent in the use of aerial photographs over the entire layout.

---

The invention described herein may be manufactured and used by or for the Government for governmental purposes without the payment to me of my royalty thereon.

One of the main difficulties in plotting maps from aerial photographs is in determining the positions of points on the ground that are clearly identifiable on the photographs. These clearly identifiable points are used as control points in plotting the map and consequently it is important to determine their ground position when possible. This determination is practically impossible, however, when, because of the ruggedness of the terrain or other reasons, the area cannot be entered to take surveys and ground measurements in the conventional manner.

This invention is concerned with eliminating the need for ground chartered control points and more specifically with an apparatus and process for pin pointing a series of control points on paper so that a draftsman may fill in accurately the details between these control points. In this invention the stereotemplet method is used which involves first positioning the control points on a stereotemplet and then from the stereotemplet onto the proper material used for constructing the map. When the stereotemplets are laid out to form a composite a degree of error occurs in the positioning of the control points because of the errors introduced in taking the aerial photographs and certain inherent errors within the measurements of the stereoplotter. The crux of this invention is to average these errors out over the entire stereotemplet layout. When it is not possible to average out these errors, they begin to accumulate additively over the entire layout so that at one end of the layout the error may be quite large compared to the individual error in the scale of each stereotemplet.

The principal object of this invention is to provide an apparatus for connecting a layout of several stereotemplets and automatically averaging the scale error between the several stereotemplets.

Another object of this invention is to provide a process for laying out a series of stereotemplets and automatically averaging the error in scale between the several stereotemplets.

Still another object of this invention is to provide a device for measuring the zero setting of the automatic stereotemplet scale adjuster.

Another object of this invention is to provide a device that is capable of connecting the two base studs of a stereotemplet in a two way spring biased manner.

An additional object of this invention is to provide a means to plot control points from aerial stereophotographs without the use of ground control points.

Figure 1:
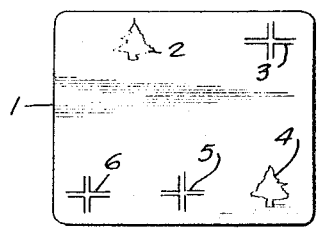
FIG. 1 is a diagram representing a stereoscopic projection of two aerial photographs as it would appear to an observer looking through the binoculars of a stereoplotter instrument.

The heart of the present invention is the automatic scale adjuster, but in order to completely understand how this device operates and the process used in determining and averaging the error in control points the making of a typical map from aerial photographs will be described. This process will be described from the taking of aerial photographs through the conventional stereoplotter machinery and finally positioning the control points on the suitable map making material so that a draftsman can fill in the details based on the control points.

Photography suitable for use with the scale adjuster cannot be obtained in the conventional manner whereby a single airplane flies back and forth over the area. Instead, the photography is obtained in a way that permits exact measurement between the exposure points of two photographs. The photographs are taken by two airplanes flying abreast and along parallel courses, each having a mapping camera pointed vertically downward. A tellurometer is mounted in one airplane and its responding element in another. By radio signal, the shutters of both cameras are tripped at the same instant and the tellurometer distance is simultaneously recorded. The distance between airplanes is such that the simultaneously exposed photographs will overlap about 60 percent, and the overlap between consecutive exposures along the line of flight is about the same.

Diapositive plates are made from two simultaneously exposed photographs and are oriented in a stereoplotter. The type of stereoplotter used is one in which the distance measured by the tellurometer may be very accurately set in the instrument at the scale of the stereomodel. This base-length, as the term is known to photogrammetrists, fixes and determines the scale of the stereomodel. It might be well to point out that the term stereomodel is used to mean two aerial photographs superimposed to give a stereo effect and the term stereotemplet is used to mean a slotted templet made of two superimposed sheets of my suitable material such as plastic of cardboard that will hold an accurate hole or slot. The stereotemplet does not have any image on it and is used only to position the different control points.

From the viewed stereomodel which is set up on the stereoplotter and viewed through a binocular arrangement, the particular points on the stereomodel can be distinguished and located. Because of the vast mechanical and optical machinery used in a stereoplotter there is often not enough room beneath the stereomodel to position a stereotemplet. In this case a separate plotting table is set up at the side of the stereoplotter and an X and Y carriage slaved to the stereoplotter. As the binocular assembly of the stereoplotter scans the stereomodel in the X and Y directions, the carriage on the plotting table follows along. The carriage carries a marking machine in which can be carried a movable pin prick. This pin prick can make a hole in a sheet of paper or a stereotemplet at a place which corresponds to the position of the binocular assembly of the stereoplotter with respect to the stereomodel. For instance, if the stereoplotter binocular assembly is positioned on a particular crossroad in the stereomodel, this position can be recorded by a pin prick on the plotting table. If another crossroad is distinguishable the binocular assembly is moved over the stereomodel to it and a corresponding pin prick is made in the stereotemplet and this will give the relative position of the two crossroads on the stereotemplet as viewed through the stereoplotter binocular assembly. From the foregoing description it can be seen that all the stereotemplet does is record the relative positions of distinguishable points on the stereomodel. The material from which the stereotemplets are made is not important as long as they are rigid enough to accurately hold a hole and slot when the studs are moved within them. There is no photograph or projection onto the stereotemplets themselves.

FIG. 1 represents the projection of two aerial photographs in stereo as seen through the binocular assembly of the stereoplotter. While there is actually no screen or projection surface, the numeral 1 represents the surface at which the projection appears to the viewer. In practice, the binocular assembly is connected to the projectors through a system of mirrors and prisms, with the left eyepiece connected to the left projector and the right eyepiece connected to the right projector. What is seen in the eyepieces by the viewer are crossroads 3, 5, and 6 and trees 2 and 4. Any distinguishable landmarks can be used for references as long as they show up clearly in the stereomodel.

Figure 2:
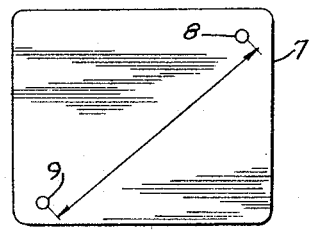
FIG. 2 is a single top sheet of a stereotemplet with the base holes punched.

FIG. 2 is a single top sheet of a stereotemplet showing two holes punched in it. The projection of FIG. 1 appeared on the stereoplotter itself and is an actual stereophotograph, while the stereotemplet of FIG. 2 is merely a flat sheet of material which is blank. This sheet as shown in FIG. 2 is placed on the plotting table and pricked with the pin carried by a carriage that is slaved to the stereoplotter binocular system. After the two pin pricks are put on a sheet of the stereotemplet, they are punched out with a punch to a diameter that is equivalent to the shank of the stud shown in FIG. 6. The base hole 8 in sheet 7 corresponds to crossroads 3 in FIG. 1 and the base hole 9 of FIG. 2 corresponds to crossroads 6 in FIG. 1. The exact relationship between holes 8 and 9 of FIG. 2 and crossroads 3 and 6 of FIG. 1 is maintained because of the slaving connection between the stereoplotter and the plotting table. The scale is obtained from the use of the distance setting computed from the tellurometer measurement.

Figure 3:
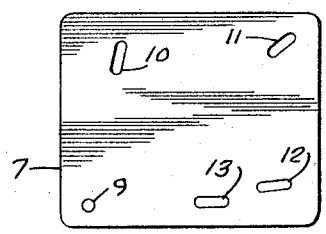
FIG. 3 is the same sheet as shown in FIG. 2 but with the control points slotted.

After a sheet 7 as shown in FIG. 2 has been marked, an exact duplicate of it is prepared with two base holes. One of these sheets will be the top and the other the bottom of two superimposed sheets of the stereotemplet. FIG. 3 shows how one of these two sheets has been slotted to become the top sheet of the stereotemplet. Base hole 9 remains as it was in FIG. 2 but base hole 8 has been punched out in a slot that has its longer axis intersecting base hole 9. Also, all other pin pricks of the identifiable objects have been slotted in a similar manner. It will be noted that all the slots 10, 11, 12 and 13 appear to radiate from base hole 9.

Figure 4:
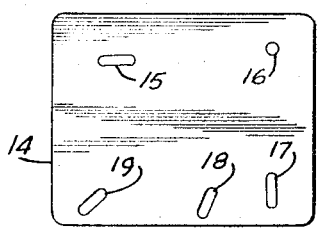
FIG. 4 is a bottom sheet of the stereotemplet showing the slotted control points and the base hole.
Figure 5:
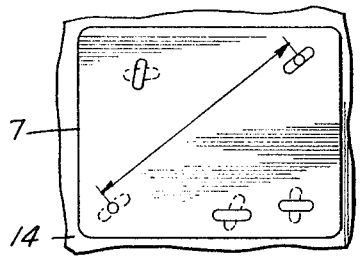
FIG. 5 is an assembled stereotemplet showing the cooperation between the slots and base holes in the top and bottom sheets.

In FIG. 4 the preparation of the bottom templet plate is shown Here, the base hole in the upper right corner is in the position corresponding to the crossroad 3 of FIG. 1 and base hole 8 in FIG. 2. The slots 15, 17, 18, and 19 radiate from base hole 16 in the bottom sheet of the templet as shown in FIG. 4. Both the top and bottom template sheets have a base hole and a base slot which is aligned with the base slot and hole of the other sheet. Because the slots of both the top and bottom sheets overlap and cross at the intersection of the pin point that was placed there from the identifiable object a scale adjustment can be accomplished as shown in the assembled templet of FIG. 5. When the top and bottom sheets are assembled as in this figure, the two sheets can slide in the direction indicated which is through the base slots and holes. The other overlapping slots are supplemental slots and cause the positioning of additional studs and control points through a pin prick through those studs. When the two base studs are moved closer together or further apart, they will move the intersection of the two intersecting slots of each additional control point. One base stud is positioned through hole 16 of the bottom sheet which is a base hole and base slot 11 of the top sheet. The other base stud of the stereotemplet is fitted through base slot 19 of the bottom sheet and base hole 9 of the top sheet.

The scale of the superimposed sheets of the stereotemplet can be changed by moving the two base studs in their only direction of allowable motion. If they are moved closer together the additional control points formed by the overlapping slots will move closer to the center of the assembled stereotemplet. If they are moved further apart the overlapping slot intersections will move further away from the center of the assembled stereotemplet. In other words the control points as indicated by studs placed through the base holes and slots and also through the overlapping slots act as sort of wheel spokes about the center of the stereotemplet. When the base studs are pulled closer together they will also pull the rest of the studs closer together because of the arrangement of the overlapping slots. The background for the use of this type of slotted templet is explained in Photogrammetric Engineering, December 1955, pages 655 to 664, by Marvin B. Scher. The same type of stereotemplets are used in the present invention, but with the addition of the automatic scale adjuster which will be described later.

Figure 7:
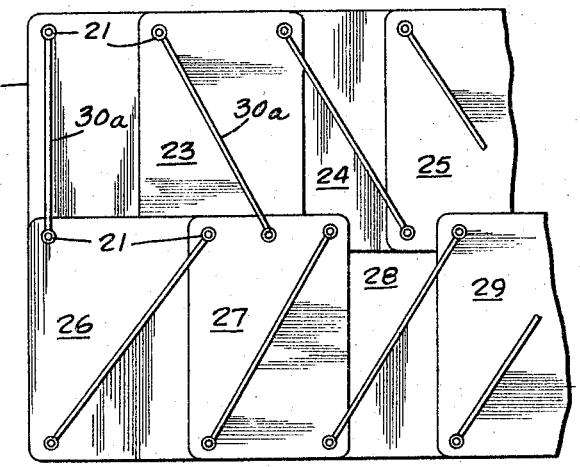
FIG. 7 is a completed layout of several stereotemplets with the automatic stereotemplet scale adjusters in place.

An example of a composite layout comprising several of these stereotemplets is shown in FIG. 7. There is no exact prescribed method of assembling the several stereotemplets, and they may be assembled in any fashion to cover the area so long as there are at least two points that are common to adjacent stereotemplets. For instance any two of the identifiable crossroads or trees in FIG. 1 may be used. The overlapping common points between adjacent stereotemplets can be either at the studs at the intersection of the overlapping slots or they can be at the base studs. However, the stereotemplet scale adjuster shown connecting the different stereotemplets is always between the two base studs on one stereotemplet. This allows lineal movement of the two base studs along the spring biased means within the stereotemplet scale adjuster. Basically, the stereotemplet scale adjuster is a linearly movable assembly that can be set in any suitable zero position and is spring biased in both directions always tending to return to the zero position.

The sample layout of FIG. 7 has stereotemplets 7, 23, 24, 25 and 26, 27, 28, and 29 laid out in an overlapping fashion. Points 41 of stereotemplet scale adjuster 30 represent the two base studs of stereotemplet 7. Points 41 of stereotemplet scale adjuster 30a represent the base studs of stereotemplet 23, etc. For clarity, the additional studs placed in the overlapping slots of each of the several stereotemplets have not been shown. Neither have the slots and base holes been shown which combine to form the position for the base studs. The complete layout of FIG. 7 is merely several individual stereotemplets of FIG. 5 arranged over a large area in overlapping fashion with interconnecting common points. For instance where the lower point 41 of stereotemplet scale adjuster 30a is positioned, the stud would go through six thicknesses of sheets; two thicknesses from stereotemplet 23, two from stereotemplet 24, and two from stereotemplet 27. At this point there would be competing forces to change the position of point 41. The overlapping slots in stereotemplet 27 through which the lower base stud of stereotemplet 23 also passes competes with the base slot and hole of stereotemplet 23 to move point 41. A similar competion is set up throughout the entire stereotemplet layout. This is the main point in the invention in that it allows the error which creeps into the stereotemplets to be averaged out over the entire layout. This averaging allows the scale error to be kept at a minimum over a large map area. The stereotemplet scale adjuster is a simple device that can average the error through linear expansion and contraction. There is no need to separate the stereotemplets or to provide for rotatable spring biasing. The manner in which these stereotemplets are assembled and the connecting link of the stereotemplet scale adjuster permits large areas of mapping to be carried out without ground control points to minimize error between the different stereotemplets.

Figure 6:
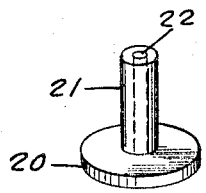
FIG. 6 is an enlarged view of the stud that is positioned to protrude through the opening caused in the superimposed sheets of the stereotemplet by the intersection of two slots or a slot and a base hole.

FIG. 6 is an enlargement of a stud. The studs are comprised of a base plate 20 which has a vertical cylindrical member 21 attached thereto. The outside diameter of the stud is identical with the diameter of the base holes and the width of the slots. A hole 22 through the center of the stud allows a pin prick to be made through the center of the stud.

Figure 8:
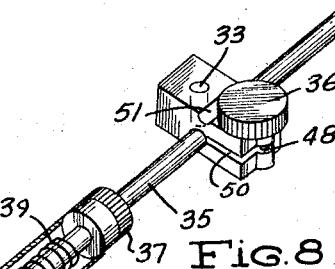
FIG. 8 is a perspective view of the automatic stereotemplet scale adjuster.

A cutaway view of the stereotemplet scale adjuster is shown in FIG. 8. It comprises a block member 32 through which is positioned a hole 34 just large enough to allow the protruding stud to fit. To this block 32 is attached through threaded means a cylindrical chamber 38 which houses the spring assembly. The upper end of this chamber is threaded and receives a plug 37 which has a center bore through which a shaft 35 can move. Slidable on shaft 35 is a sliding block assembly comprised of a rectangular block 31 having a stud hole 33 and a thumb screw 36 for clamping the block assembly on shaft 35. The distance between hole 33 on the block assembly and hole 34 in block member 32 is held at a zero position which can be set by sliding block assembly 31 along shaft 35 and clamping in on the shaft. When the zero setting is made, the spring assembly within the cylinder 38 permits the distance between the two holes 33 and 34 to be pulled further apart or pushed closer together by an outside force. However, the spring bias within the spring assembly always has a tendency to force the distance between the two holes to conform to the zero setting.

The cutaway view of the spring assembly in FIG. 8 shows an upper spring 39 which surrounds shaft 35 and is compressed between the interior of plug 37 and a ridge 42 on the shaft 35. This spring exerts a compressive force which resists the block member and the block assembly being pulled apart. Below the ridge 42 is a spacer element 43 which separates the shaft member 35 and the stop member. Below the spacer element 43 is a separate stop member having a center shaft 45 and a disc 44 attached to its upper end. This disc 44 butts against spacer 43 at one end and the shaft 45 forms a compression stop by butting against block member 32. Between block member 32 and the disc member 44 is a second compression spring 46 which surrounds shaft 45. This spring 46 forms a bias against pushing the block assembly and the block member together. The compression of this spring is limited when shaft 45 comes into contact with block member 32.

Figure 10:
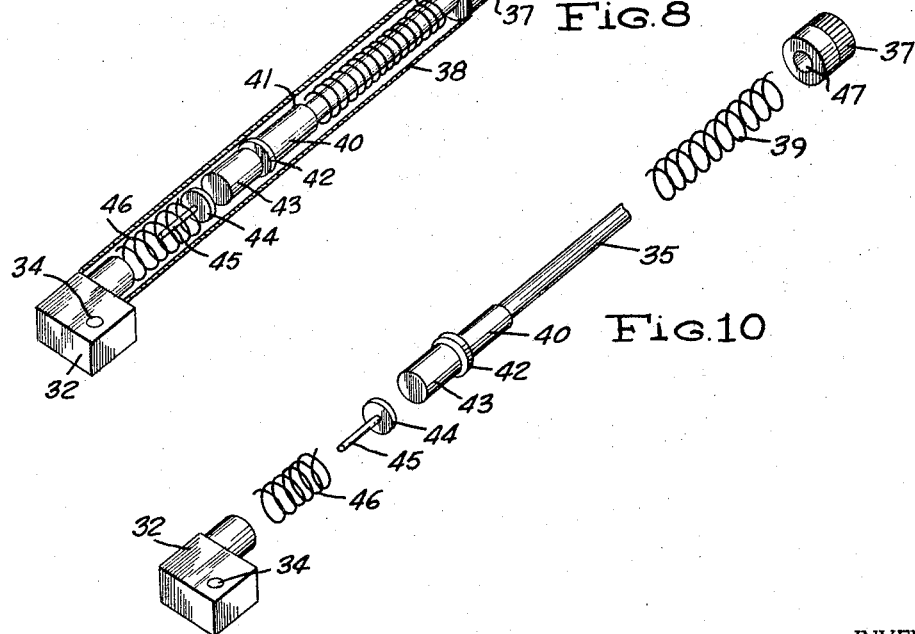
FIG. 10 is an exploded view of the spring assembly of the automatic stereotemplet scale adjuster.

In FIG. 10 is an exploded view of the spring assembly showing in more detail the parts of the spring assembly. At the center of the spring assembly is a shaft member 35 with a ridge or flange 42. The enlarged portion 40 butts against the internal surface of plug 37 which has a bore 47 sufficient in size to allow the shaft member 35 to pass but not large enough to allow the enlarged portion 40 to pass. Below the ridge 42 is a spacer 43 against which the spacer disc 44 can make contact. When the spring assembly is connected inside the housing 38 and plug 37 and block member 32 screwed in the two springs act to oppose each other and to always return the shaft 35 to its zero position. If the force exerted to change the distance between the two stud holes in the stereotemplet scale adjuster is great enough it will alter the distance between these two stud holes. In fact when the entire layout of FIG. 7 is assembled it is quite possible that few of the stereotemplet scale adjusters will be in the zero position because they each will be competing against each other to correct the error that has crept into the stereotemplet layout. This competing pressure on each stereotemplet scale adjuster acts to average the error.

Figure 9:
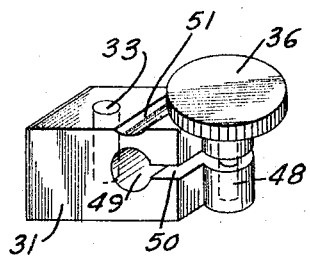
FIG. 9 is an enlarged view of the sliding stud holder of the automatic stereotemplet scale adjuster.

An enlargement of the sliding block assembly is shown in FIG. 9. This block assembly is comprised mainly of a rectangular block 31 with a bore 33 which is capable of receiving the protruding stud from the stereotemplet. At right angle to bore 33 and spaced a distance from it is another bore 49 which fits over shaft 35. This bore 49 has a slot cut through one side at 50 to allow the bore 49 to be clamped around shaft 35 by screw 48. Screw 48 is operated by thumb screw 36. Directly across the top of the block 31 and aligned with bore 49 is groove 51 which weakens the portion of the block 31 above bore 49 allowing it to give enough to clamp around shaft 35.

Figure 11:
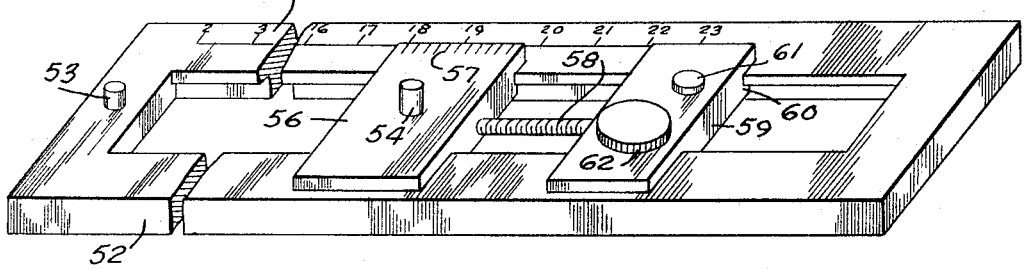
FIG. 11 is a perspective view of a measuring device for measuring the distance between the centers of the automatic stereotemplet scale adjuster.

A measuring device, FIG. 11, is used for setting distances between the holes 34 and 33 in the block member and the block assembly of the stereotemplet scale adjuster. When the points for the stereotemplets are not plotted by the coordinatograph of a stereoplotter, the coordinates of the points are read directly from the stereoplotter and recorded. Subsequently, the distances between the base holes are computed from these coordinates and set in the measuring device. A stereotemplet scale adjuster is prepared for each of these distances as set in the measuring device. Each scale adjuster is then used on its respective stereotemplet. The measuring device comprises a flat plate 52 which has a rectangular portion cut out. measuring device is a scale graduated in millimeters. A locking member 59 is positioned to slide between the two outer rails of the framework and operate a sliding vernier member 56. This locking member has a movable split lip 60 which can clamp on the inside of the rail of the framework. Lip 60 is clamped in place by means of screw 61. Screw 62 is fastened to a worm gear that operates threaded screw 58 which in turn operates vernier member 56. Vernier member 56 has a vernier scale 57 which slides along between the two rails of the frame 52 and coacts with scale 55 to produce a vernier setting. Two studs 53 and 54 are affixed permanently to the end of the frame 52 and the sliding vernier 56 respectively. These studs are of the same diameter as the studs used in the stereotemplet and are used to set the distance between the holes of the stereotemplet scale adjuster.

The process for using the automatic stereotemplet scale adjuster is as follows: first, stereoscopic aerial photographs of an area are taken in a manner that permits accurate measurement of the horizontal distance between the exposure points. This can be accomplished by several methods, one of which is to use two airplanes flying abreast with their mapping cameras synchronized and with the tellurometer distances between the planes measured simultaneously with each exposure. A stereopair of photographs taken in this manner is oriented in a stereoplotter to form a stereomodel whose scale is fixed by inserting the scaled equivalent of the tellurometer distance into the stereoplotter. For example, if the planes were flying exactly 6,000 feet apart and the scale of the stereomodel is to be 1 to 6,000, then the projectors of the stereoplotter are set exactly 1 foot apart. These measurements are given merely as an example and are not meant to be limiting.

After the steromodel has been set up on the stereoplotter, the binocular assembly is aligned by means of a floating mark or other positioning device on an identifiable object in the projected stereomodel. As the binocular assembly is moved to be directly over the crossroads or other identifiable object a carriage assembly is following the position of the binocular assembly through a coupling linkage. This carriage which is mounted on a plotting table carriers a pin prick device that will prick a particular point on a single sheet of the stereotemplet. After two base pin pricks have been made they are punched out as base holes. An exact duplicate of the single sheet of stereotemplet is made and punched. Following this the other identifiable objects are pin pricked and slotted so that the slots radiate from a particular base hole in each sheet. By placing studs through each of the base holes and overlapping slots a single stereotemplet of two superimposed sheets is completed. The same procedure is followed with each pair of stereoaerial photographs which make up each stereomodel. When all the stereotemplets have been made to cover the entire area to be mapped the stereotempleting has been completed. Sometimes the number of stereotemplets used can run into hundreds.

Assembly of an entire layout is accomplished by first laying out on a large table a sheet of drafting paper on which the map is to be drawn. Then the stereotemplets are assembled in a composite layout over the drafting paper, with the automatic stereotemplet scale adjusters connected for example as in FIG. 7. At each stud which is placed either at the intersection of the two overlapping slots or at the base holes, a pin prick is made through the stud and labeled. These pin pricks form the control points of identifiable objects on the drafting paper. With the control points on the drafting paper, a draftsman can project a stereomodel onto the drafting paper and align it according to the control points of which the error has been averaged over the entire map. The projection onto the drafting paper allows the draftsman to accurately fill in the details of the map from a series of stereomodels each of which have been aligned on the pin prick on the drafting paper which correspond to identifiable objects on the stereomodel.

I claim:

1. A stereotemplet scale adjuster comprising:
    (a) a block member having a hole adapted to receive a stud of a slotted stereotemplet;
    (b) a two way linearly biased spring assembly attached to said block member;
    (c) a shaft connected to said spring assembly and capable of reciprocal movement to opposite sides of a zero point of said spring assembly; and
    (d) a block assembly slidable along said shaft and adapted to be clamped to said shaft at any position along said shaft, said block assembly having a hole adapted to receive a stud of a slotted stereotemplet.

2. In a two-sheet stereotemplet having a base hole in each sheet, overlapping slots and a stud passing through each base hole, a longitudinal scale adjuster interconnecting the studs, said scale adjuster comprising spring biasing means adapted to resist motion of the interconnected studs towards and away from each other.

3. A process for making maps from stereoscopic aerial photographs comprising the steps of:
    (a) orienting a pair of stereoscopic aerial photographs in a stereoplotter, using a known distance between exposure points to control the scale of the stereomodel;
    (b) marking identifiable landmarks observed in the stereomodel derived from said photographs on a first sheet of templet material;
    (c) making a duplicate set of said reference marks on a second sheet of templet material;
    (d) marking base holes at corresponding reference marks on said first and second sheets, said base holes adapted to receive studs;
    (e) connecting a stereotemplet scale adjuster between the studs in the pair of base holes in each stereotemplet;
    (f) forming slots at all of said reference marks exclusive of the first base hole on the first sheet and the second base hole on the second sheet, said slots being so formed in each sheet that extensions of their longitudinal axes intersect the remaining base hole, said slots adapted to slidably receive studs;
    (g) superimposing the two said sheets to form a stereotemplet, joining said sheets by a stud inserted in each pair of overlapping slots and holes;
    (h) constructing a separate stereotemplet from the stereomodel derived from each matched pair of stereoscopic aerial photographs;
    (i) making a stereotemplet layout by assuming the several stereotemplates in an overlapping pattern, each stereotemplet having at least two stud control points in common with adjacent stereotemplets;
    (j) transferring the locations of reference marks from said stereotemplet layout to drafting paper by making means;
    (k) projecting the stereomodel of each matched pair of stereoscopic aerial photographs onto said drafting paper, positioning said stereomodel by reference to the reference marks on the drafting paper; and
    (l) duplicating details from the stereomodel on the drafting paper by drafting means.

4. A stereotemplet layout comprising a series of overlapping stereotemplets each stereotemplet having at least two control points in common with the adjacent stereotemplet and a pair of base studs; a linear, double-acting, spring-biased mechanism interconnecting the two base studs of each stereotemplet, said double-acting, spring-biased mechanism having a balanced zero position previously set to correspond to a predetermined distance between said base studs.

No references cited.

LEONARD FORMAN, *Primary Examiner.*

W. D. MARTIN, *Assistant Examiner.*